United States Patent [19]

Cosenza

[11] Patent Number: 5,076,747
[45] Date of Patent: Dec. 31, 1991

[54] PANEL FASTENER HAVING INTERNAL THREADS AND HAVING MAXIMUM RETAINING RING RETENTION CAPABILITY

[75] Inventor: Frank J. Cosenza, Santa Barbara, Calif.

[73] Assignee: VSI Corporation, Chantilly, Va.

[21] Appl. No.: 594,755

[22] Filed: Oct. 9, 1990

[51] Int. Cl.[5] .............................................. F16B 21/18
[52] U.S. Cl. .................................... 411/353; 411/103; 411/999
[58] Field of Search ............... 411/103, 107, 105, 353, 411/999

[56] References Cited

U.S. PATENT DOCUMENTS

| | | | |
|---|---|---|---|
| 2,949,143 | 8/1960 | Shur | 411/353 |
| 2,991,816 | 7/1961 | Harbison et al. | |
| 3,037,542 | 6/1962 | Boyd | 411/105 |
| 3,062,253 | 11/1962 | Millheiser | 411/353 |
| 3,093,179 | 6/1963 | Zahodiakin | 411/353 |
| 3,896,867 | 7/1975 | Gill et al. | 411/999 X |
| 4,324,517 | 4/1982 | Dey | |
| 4,432,680 | 2/1984 | Molina | 411/105 X |
| 4,470,735 | 9/1984 | Salisbury | 411/353 |
| 4,735,536 | 4/1988 | Duran | 411/353 |
| 4,747,738 | 5/1988 | Duran | 411/107 X |
| 4,815,908 | 3/1989 | Duran et al. | 411/353 |

Primary Examiner—Rodney M. Lindsey
Attorney, Agent, or Firm—Irving Keschner

[57] ABSTRACT

An internally threaded fastener comprising a stud having internal threads, a stud hold-out ring, a grommet having a cylindrical surface of a first diameter, external slots formed in the surface and a retaining ring having inwardly extending projections adapted to slide within the grommet slots. An internal groove is formed in the grommet and a slotted snap ring is embedded in the groove. A receptacle having an externally threaded screw mounted therein is affixed to the substrucutre, or lower panel. The stud is mounted in the grommet and the assembly is then inserted through an aperture formed in the upper panel in a manner such that the receptacle screw engages the internal threads of the stud. The stud has two grooves formed thereon, the snap ring being forced into the first groove when the stud is threaded into the receptacle. The first groove includes an angled portion such that when the stud is being unscrewed, the snap ring is forced over the angled portion onto the smooth shank portion of the stud, the grommet being ejected from the substructure aperture. As the stud is unscrewed further, the snap ring moves along the shank portion until it snaps into the second groove, preventing disengagement of the stud from the grommet and maintaining the stud in the hold-out position.

6 Claims, 3 Drawing Sheets

PANEL FASTENER HAVING INTERNAL THREADS AND HAVING MAXIMUM RETAINING RING RETENTION CAPABILITY

BACKGROUND OF THE INVENTION

1. Field of the Invention

The present invention relates to an internally threaded fastener having a smooth forward end portion and which provides for maximum retaining ring retention.

2. Description of the Prior Art

Prior art internally threaded fasteners that have a smooth, probing lead-in feature suffer in that the panel retaining device utilized to secure the fastener to the panel itself may slip off the fastener. The prior art internally threaded fasteners which typically comprise a stud having an internally threaded aperture, a grommet which functions to both retain the stud to the panel and maintain the stud in an upright, or hold-out, position when the stud is disengaged from a substructure, and a receptacle which contains a threaded screw for insertion into the stud aperture typically utilize a flexible wire type ring that expands and retracts depending on the diameter of the fastener portion it resides on at a given point of time as shown, for example, in U.S. Pat. No. 2,991,816 to Harbison et al. In particular, this type of ring causes retention problems because it has to accommodate three different diameters to function properly. As a result, its holding capabilities are limited. This problem is aggravated when angularity, twisting and pull-out of the fastener is attempted, often resulting in the conventional retaining ring slipping off the fastener.

These types of fasteners are typically utilized to fasten doors to an airplane frame, the grommet typically fitting into the frame (substructure) when the fastener is assembled. However, side loads created by the fuel and/or other loading added to the airplane can make it extremely difficult for the grommet to be removed from the substructure aperture thus preventing the door from being opened.

U.S. Pat. No. 4,324,517 to Dey discloses a panel fastener assembly which seeks to overcome the disadvantages of the Harbison et al. fastener, i.e. the spring has not reliably and consistently retained the sleeve bolt in the panel when the panel is disengaged from the aircraft substructure. The Dey assembly includes a sleeve bolt, a grommet assembly which is attached to the panel and a receptacle assembly which is attached to the substructure. The sleeve bolt passes through the grommet assembly and engages the receptacle assembly thereby joining the panel and the substructure. The grommet assembly includes a retainer ring which engages a groove in the sleeve bolt when it is in its withdrawn position so that the sleeve bolt is retained in the panel and remains in its withdrawn position when the panel is disengaged from the substructure.

Although the Dey device improves over the earlier Harbison et al. fastener, it still have disadvantages. For example, the single retainer ring utilized must repeatedly pass through at least two diameters during its use and thus could be subject to failure. Further, side loads on the sleeve bolt in the substructure may make it difficult to remove the sleeve bolt. The Dey device, although improving the retaining ring holding capability, sacrifices the probing or misalignment feature of the Harbison fastener. This feature comprises an area below the grip portion of the Harbison fastener is reduced in diameter to aid in installation of the fastener by allowing the operator to search for the receptacle when the holes are misaligned. As the fastener is secured, the full diameter of the grip section aligns the outer panel perfectly with the substructure hole. It also aids the operator when the fastener is to be removed. As the fastener is unloosened, the outer panel is allowed some misalignment when the full diameter of the grip section exits the substructure. This occurs because the diameter of the fastener adjacent to the grip portion is significantly smaller. The Dey device does not incorporate this probing feature of Harbison.

What is thus desired is to provide an internally threaded fastener in which the panel retaining ring utilized is configured to have maximum retention capabilities, wherein a structural feature of the fastener is used to eject the grommet from the substructure as the stud is being disengaged from the receptacle screw and wherein the fastener has a reduced entrance diameter for maximum probing capability.

SUMMARY OF THE PRESENT INVENTION

The present invention provides an internally threaded fastener having a smooth forward end portion which includes a retaining ring arranged to have maximum retention capabilities.

The fastener comprises a stud having internal threads, a stud hold-out ring, a grommet having a cylindrical surface of a first diameter, external slots formed in the surface and a retaining ring having inwardly extending projections adapted to slide within the grommet slots. An internal groove is formed in the grommet and a slotted snap ring is embedded in the groove. A receptacle having an externally threaded screw mounted therein is affixed to the substructure, or lower panel. The stud is mounted in the grommet and the assembly is then inserted through an aperture formed in the upper panel in a manner such that the receptacle screw engages the internal threads of the stud. When the stud is installed on the screw, the upper panel is pulled down in to engagement with the lower panel. The stud has two grooves formed thereon, the snap ring being forced into the first groove when the stud is threaded into the receptacle. The first groove includes an angled portion such that when the stud is being unscrewed, the snap ring is forced over the angled portion onto the smooth shank portion of the stud, the grommet being ejected from the substructure aperture. As the stud is unscrewed further, the snap ring moves along the shank portion until it snaps into the second groove, preventing disengagement of the stud from the grommet and maintaining the stud in the hold-out position.

The load releasing snap ring functions only when an axial load of predetermined value is applied to the stud, applying a predetermined amount of axial force against the grommet so that the grommet is ejected from the substructure at the time the stud is moving towards its hold-out position as it is being unscrewed.

The present invention thus overcomes the disadvantages of the prior art type fasteners by providing a panel fastener configured to maintain the retention capabilities of the retaining ring feature, thus compensating for the side loads normally present which would otherwise prevent the fastener releasing from the substructure and which also allows maximum probing of the aperture formed in the substructure.

DESCRIPTION OF THE DRAWING

For a better understanding of the invention as well as other objects and further features thereof, reference is made to the following description which is to be read in conjunction with the accompanying drawing wherein.

DESCRIPTION OF THE INVENTION

Figure 1:
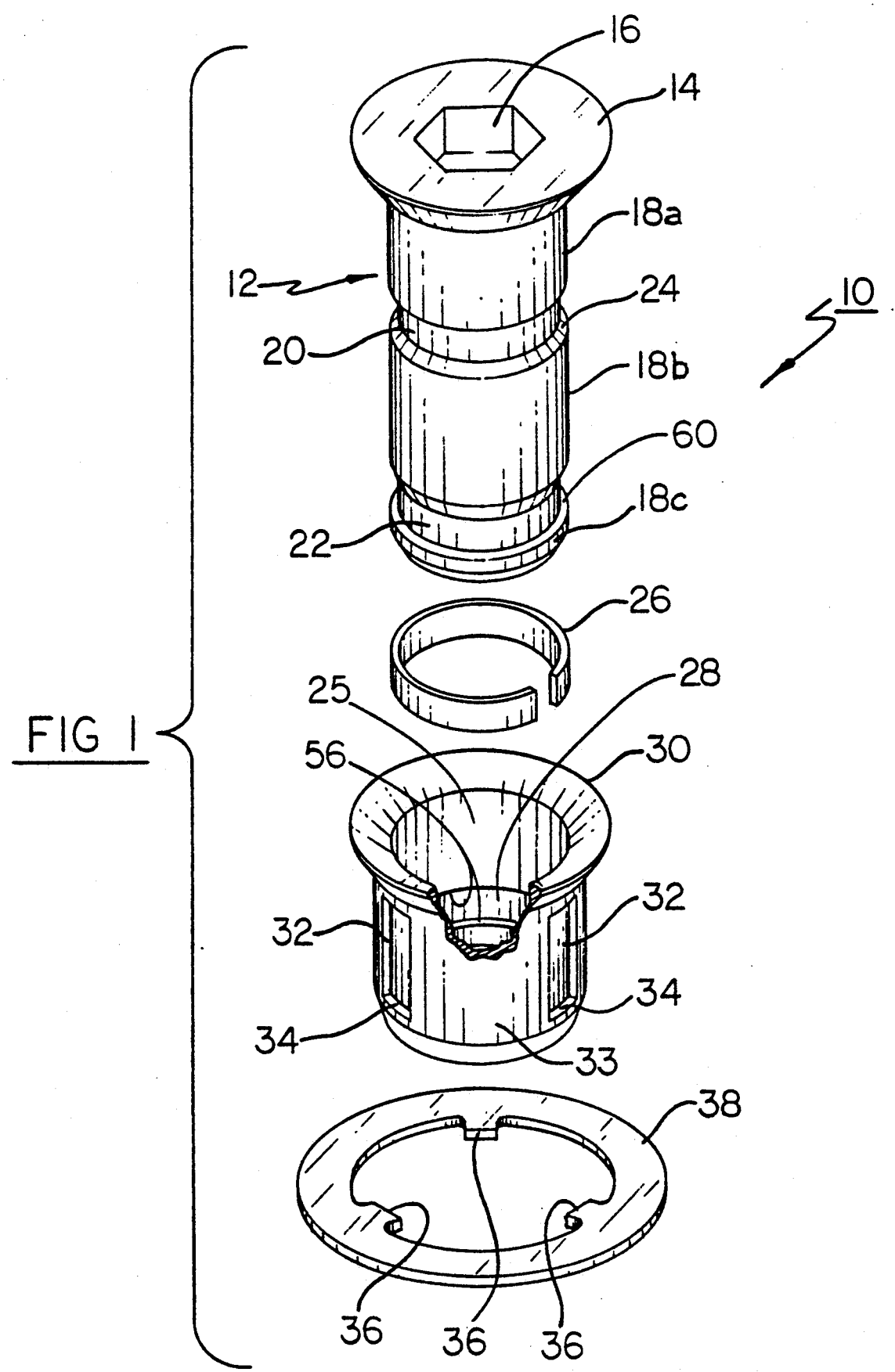
FIG. 1 an exploded view of the components that comprise the fastener assembly of the present invention.

Referring now to FIG. 1, an exploded view of the panel fastener 10 of the present invention is illustrated. It should be noted that the receptacle 11 shown in FIGS. 2-7, although part of the panel fastener assembly will not be described in detail as it does not form part of the present invention.

The panel fastener 10 comprises a threaded sleeve bolt, or stud, 12 having a head 14 with a hex tool recess 16 (shape of head and recess are optional). The smooth probing lead-in shank portions 18b and 18c are separated by groove 22, the smooth portion 18a between the head of the fastener and groove 20 being a close sliding fit with bore 25 of grommet 30, groove 20 having an angled portion 24 formed thereon. In particular, the sloping surface of portion 24 forms an angle greater than zero degrees, preferably in the range form about 10 degrees to about 80 degrees, with respect to a plane perpendicular to the center line of stud 12. A split, flexible load releasing snap ring 26 is positioned in a groove 28 (positioning not shown in FIG. 1) in grommet 30 during initial installation. In particular, ring 26 is embedded in groove 28, in a firm but sliding fit existing between the outside diameter of stud 12 and the inside diameter of ring 26. Grommet 30 has three longitudinal slots 32 (only two shown in FIG. 1), each slot having a shoulder portion 34. Slots 32 are adapted to receive tabs 36 of retaining ring 38 in a conventional manner. As shown, slots 32 are formed in the cylindrical portion 33 of grommet 30, portion 33 having a uniform diameter along its length.

Figure 2:
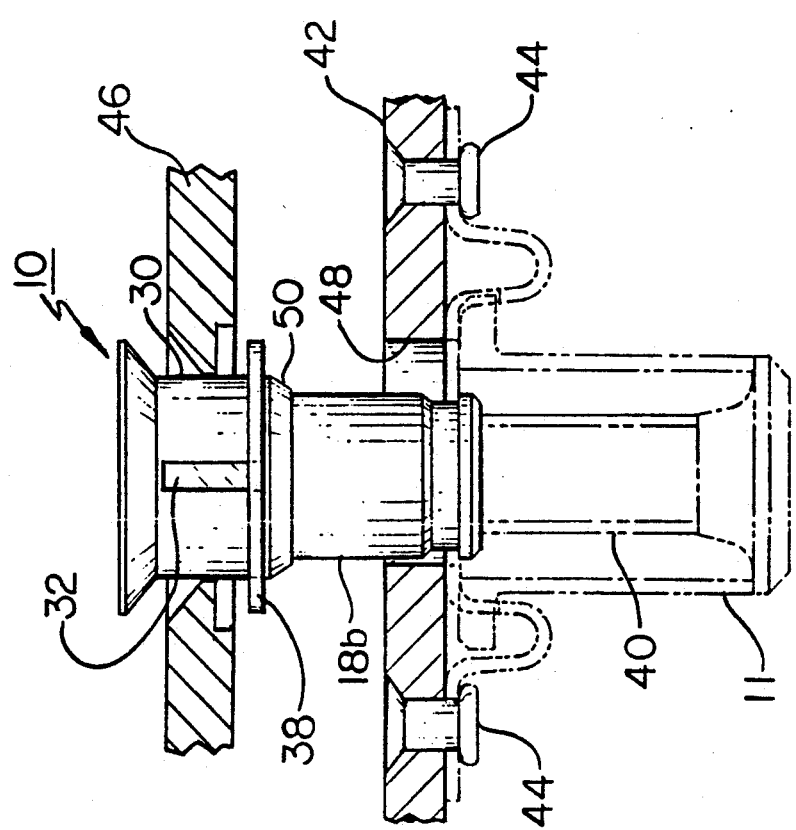
FIG. 2 illustrates the panel in the process of being joined together.
Figure 4:
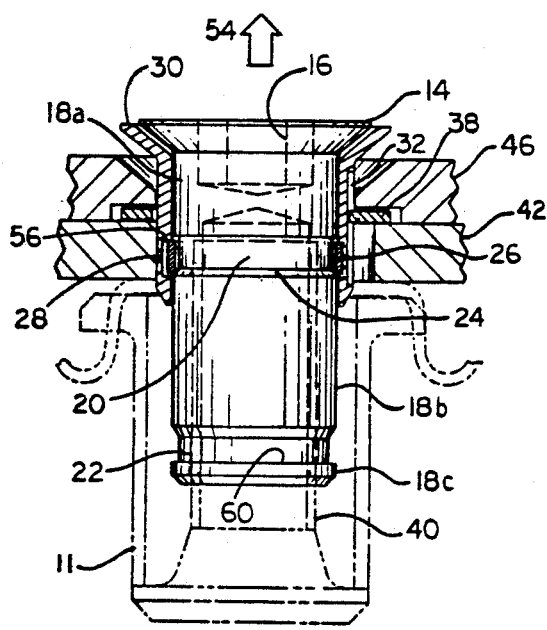
FIG. 4 illustrates the fastener assembly as the sleeve bolt is initially disengaged from the stud.

FIG. 2 illustrates fastener 10 being installed on receptacle screw 40, the internal threads of stud 12 mating with the external threads of screw 40. Receptacle 11 is secured to a lower panel, or substructure, 42 by rivets 44 as illustrated. As stud 12 is installed (installation tool not shown), upper panel 46 is pulled down into contact with lower panel 42. It should be noted that receptacle 11 is joined to panel 42 in a manner such that is offset from aperture 48 in panel 42. The purpose of smooth shank portion 18b is to engage the aperture 48 when it is off center. As the stud is further tightened, angle portion 50 on grommet 30 forces upper panel 46, i.e. the door of an airplane, to move over to be in alignment.

Figure 3:
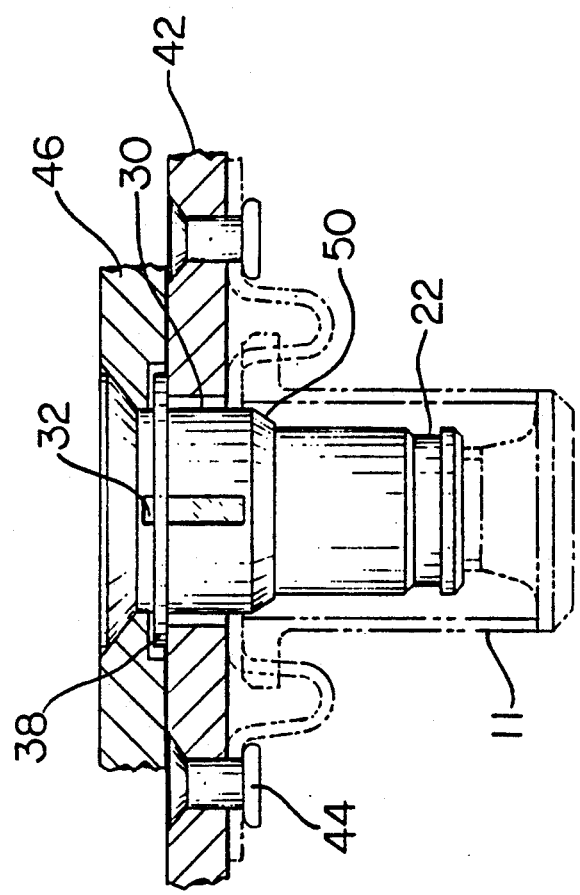
FIG. 3 shows the fastener assembly in the assembled position.

The installed and aligned fastener assembly 10 is shown in FIG. 3.

Figure 5:
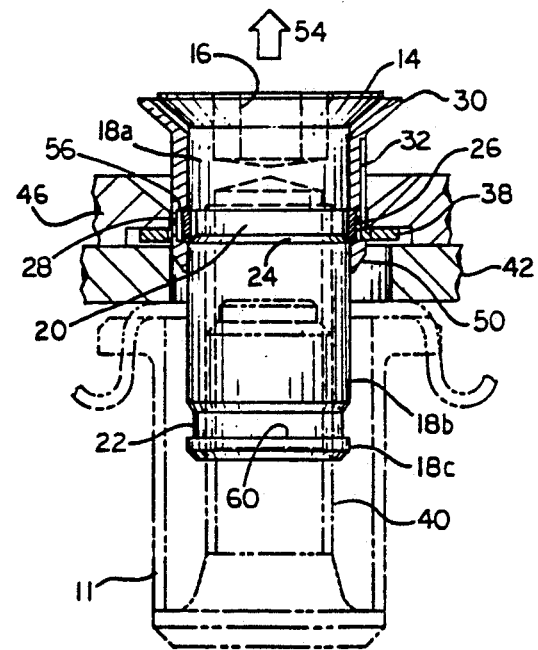
FIG. 5 illustrates the continued disengagement of the sleeve bolt from the stud from the position shown in FIG. 4 and with the grommet assembly ejected from the substructure.
Figure 6:
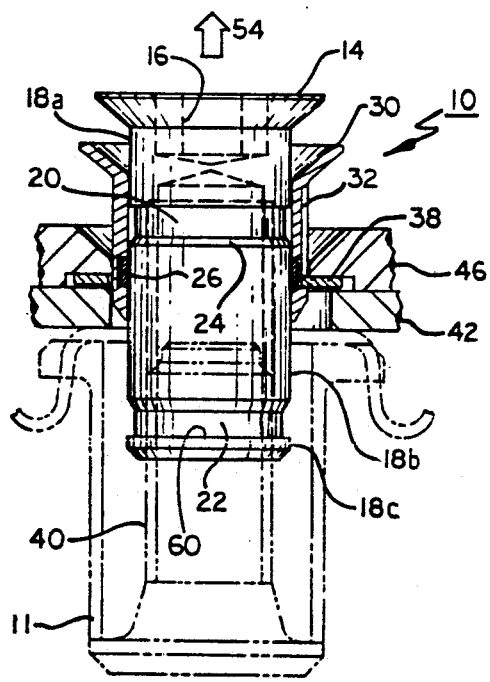
FIG. 6 illustrates the fastener assembly as the sleeve bolt continues to be disengaged from the stud from the position shown in FIG. 5.
Figure 7:
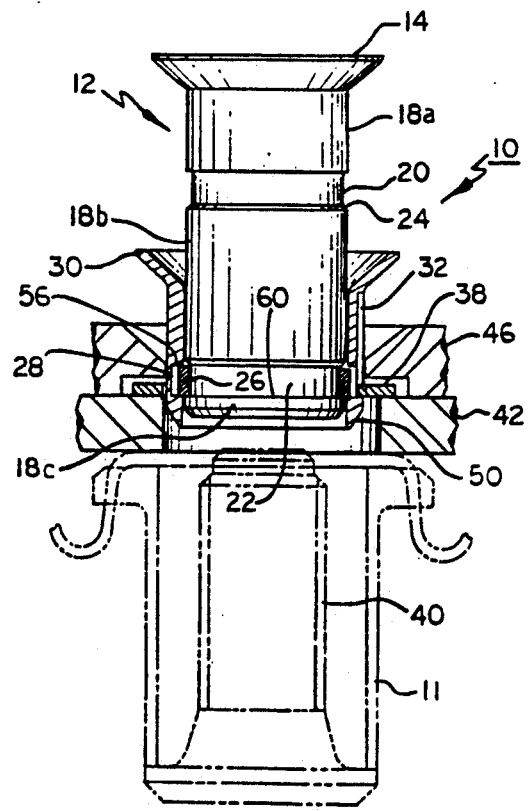
FIG. 7 illustrates the sleeve bolt in the hold-out position.

As noted above, an important feature of the present invention is the provision of groove 20 with its angled portion 24. In particular, normal and common side loads or pressure on substructure 42 (i.e., if substructure 42 is an airframe, for example, fuel and/or other loading can cause the side loads to be generated), forces the grommet body into contact with the substructure aperture making removal by hand often difficult and sometimes impossible. In order to remove the grommet from this position (for example, the grommet would be in the position shown in FIG. 3) and to allow panel 46 to be separated from panel 42, pressure (force) is needed to eject the grommet from panel 42. This is accomplished as follows:

The installation tool in inserted into hex recess 16 and rotated in the counter clockwise direction. As stud 12 is being disengaged from screw 40 in the direction of arrow 54 (FIG. 4), split ring 26 by design, resists the outward force in the radial direction. During the time that ring 26 engages ramp 24, the removal load is applying a force to shoulder 56 of groove 28 (shown in perspective view in FIG. 1) via split ring 26. The groove angle 24 and the characteristics of ring 26 are selected such that sufficient force is applied to grommet 30 to overcome expected side load pressures. The grommet 30 is ejected from panel 42 to the position determined by retaining ring 38 as shown in FIG. 5. Continued disengagement of stud 12 from screw 40 expands ring 26 so that it fully is embedded within groove 28, allowing stud 12 to freely move in the direction of arrow 54 (FIG. 6) until it reaches the position shown in FIG. 7. In this position, ring 26 snaps into groove 22 on stud 12, stud 12 being prevented from further disengagement from grommet 30 (stud hold-out position) since ring 26 is in contact with shoulder 60 of groove 22.

The retaining ring 38 in the panel fastener 10 of the present invention is only required to interact with one grommet diameter and to slide along a short distance when compared to the prior art internally threaded, smooth bore fasteners. In addition, tabs 36 are relatively short and strong. These characteristics of the retaining ring allow it to have an increased retention capability when compared to prior panel fasteners of the internally threaded, smooth probe lead-in types.

The present invention thus provides an improved panel fastener that has maximum retaining ring retention on the top panel, a smooth pilot lead-in portion, no external threads and superior probing capabilities, the panel fastener having a stud portion that telescopes inside the grommet. In addition, a simplified mechanical configuration enables the grommet to overcome the side loads of the substructure and thus be mechanically ejected from the substructure when the stud is disengaged.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. An improved fastener assembly for joining a panel to a substructure including a grommet assembly having an annular body which is adapted to be secured to the panel and an annular resilient first retainer having a split therein, said annular body being adapted to receive said retainer ring and including a plurality of longitudinal slots formed on the outside surface thereof; a receptacle assembly which is adapted to be connected to the substructure including a threaded stud; and a threaded sleeve bolt having a head at one end formed to abut the panel and adapted to threadably engage said stud, said sleeve bolt having a first annular groove adjacent the other end thereof and being adapted to be engaged by said first retainer ring to secure said sleeve bolt to said grommet assembly when said sleeve bolt is threadably disengaged from said stud; and a second retainer ring having a plurality of inwardly extending tab portions, said second retaining ring being mounted to said annular body such that said tab portions extend into corresponding longitudinal slots, said sleeve bolt having a second annular groove adjacent said head end and adapted to be engaged by said first retainer ring when said sleeve bolt is threadably engaged to said threaded stud.

2. The fastener assembly of claim 1 wherein said second annular groove has an outwardly sloping surface forming an angle with respect to a plane perpendicular to the center line of said sleeve bolt.

3. The fastener assembly of claim 2 wherein the angle of said sloping surface is in the range from about 10 degrees to about 80 degrees.

4. The fastener assembly as defined in claim 2 wherein the initial disengagement of said sleeve bolt from said stud causes said first retainer ring to move along the sloping surface of said second circular groove and apply a force to said grommet assembly in a direction substantially parallel to the center line of said sleeve bolt.

5. The fastener assembly of claim 4 wherein said grommet assembly comprises a groove with a shoulder portion formed in the interior surface thereof, said first retainer ring engaging said shoulder portion as said sleeve bolt is disengaged from said stud to apply force to said grommet assembly in said substantially parallel direction.

6. The fastener assembly of claim 5 wherein the angle of said sloping surface is selected such that the force applied to said shoulder is sufficient to overcome said forces applied to said grommet assembly which otherwise causes the grommet assembly to remain in the substructure as the sleeve bolt is being disengaged from said stud.

* * * * *